United States Patent [19]
Curtis et al.

[11] Patent Number: 6,120,594
[45] Date of Patent: Sep. 19, 2000

[54] HYDROGEN PEROXIDE OXIDATION OF CARBON BLACK

[75] Inventors: John Carleton Curtis; Rodney L. Taylor; George A. Joyce, all of Monroe, La.

[73] Assignee: Columbian Chemicals Company, Marietta, Ga.

[21] Appl. No.: 09/301,504

[22] Filed: Apr. 28, 1999

Related U.S. Application Data

[63] Continuation of application No. 08/790,510, Jan. 29, 1997, abandoned.

[51] Int. Cl.[7] .................................................... C09C 1/56
[52] U.S. Cl. ............................................ 106/478; 106/472
[58] Field of Search ...................................... 106/472, 478

[56] References Cited

U.S. PATENT DOCUMENTS

| | | | |
|---|---|---|---|
| 3,279,935 | 10/1966 | Daniell | 106/307 |
| 4,075,157 | 2/1978 | Johnson | 423/445 |
| 4,631,304 | 12/1986 | Wilder | 523/215 |

OTHER PUBLICATIONS

Lezhnev et al, "Preparation of oxidized PM–100 . . . ", Nov. 1974.

*Primary Examiner*—David Brunsman
*Attorney, Agent, or Firm*—Garvey Smith Nehrbass & Doody LLC

[57] ABSTRACT

A process for the oxidation of carbon black with an aqueous mixture of hydrogen peroxide where carbon blacks are mixed with aqueous hydrogen peroxide then dried in order to efficiently oxidize industrial quantities of carbon black using standard carbon black production equipment and production rates and under conditions that produce no hazardous emissions and require no special handling.

8 Claims, No Drawings

HYDROGEN PEROXIDE OXIDATION OF CARBON BLACK

This is a continuation of U.S. application Ser. No. 08/790,510 filed Jan. 29, 1997, now abandoned.

BACKGROUND OF THE INVENTION

1. Field of the Invention

The present invention relates the oxidation of carbon black with an aqueous mixture of hydrogen peroxide. More specifically, the present invention relates to an improved method for oxidizing carbon blacks, including rubber grade carbon blacks, with liquid hydrogen peroxide where the carbon blacks are efficiently oxidized in industrial quantities using standard carbon black production equipment and production rates and under conditions that produce no hazardous emissions and require no special handling.

2. General Background

Carbon black is the accepted generic name for a family of small particle size carbon pigments which are formed in the gas phase by the thermal decomposition of hydrocarbons. Carbon blacks are currently sold in the form of more than 100 different commercial grades which vary in their particle size, aggregate structure, porosity, and surface chemistry.

Historically, carbon blacks have been manufactured by different major processes including the lampblack process, the impingement process, the acetylene black process, the thermal black process, the gas furnace, and the oil furnace process. The process used to manufacture the carbon black is extremely important; indeed, the manufacturing process frequently has more of an impact on the product and its final characteristics than the raw material from which it is made.

The lampblack process is the oldest of all the processes and is now practically obsolete in the U.S. and most other locations. Lampblacks are made by burning aromatic oils such as naphthalene, anthracene, or creosote. Typically, the oil is burned in shallow pans with limited air supply and the carbon black formed is drawn off into settling areas and collected periodically. This is a low temperature operation and the particle size tends to be fairly large (about 70 to about 100 nm average diameter) and highly aggregated to produce a stringy chain structure.

Impingement (or "channel") process carbon blacks were first produced during the 1870's and reached their peak production in the 1920's and 1930's. In this process, natural gas (typically reinforced with a vapor of hot oil) was burned from slotted lava tips to produce fan-type flames in evenly spaced rows. These were set to impinge on channel irons on which the carbon black was deposited. During exposure to air on the hot channel irons, the carbon black becomes highly oxidized (e.g., 2.5 to 3.5% oxygen content). This high level of oxygen, obtained without resorting to a post treatment, is unique among the different carbon black processes. The combination of the natural gas feedstock and cooling without quench water also provides for a very low inorganic content. Unfortunately, the process is relatively inefficient in its use of increasingly expensive natural gas, and can pollute the atmosphere. Thus, it too has fallen into the same category as the lampblack process and is little used in the U.S. Carbon blacks with high oxygen surface functionality are now generally produced by post chemical oxidation of oil furnace products.

In the acetylene black process, carbon black is made from the thermal decomposition of acetylene gas. In one common embodiment, acetylene gas is introduced at the top of a cylindrical reactor which is several meters high. The reactor is preheated to about 800° C. to decompose the acetylene. This is a rather violent exothermic reaction which produces temperatures up to about 3000° C. Proceeding from the entry point of the acetylene gas down into the upper part of the furnace there is a temperature gradient of about 3000° C. Carbon black formation most likely takes place in the 800 to 2000° C. zone, followed by partial graphitization in the higher temperature region. Air enters into the bottom of the reactor and acts to combust the hydrogen that is formed. In addition, the air flow prolongs the residence time of the acetylene black aggregates in the hot zone of the reactor which eliminates any residual hydrocarbons and further unifies the highly graphitic microstructure of the final product. Acetylene black is also produced commercially by the thermal decomposition of acetylene gas in stainless steel retorts which are water cooled. Because of its highly graphitic surface, acetylene black exhibits low reactivity and contains a very low level of oxygen volatile. This type of carbon black is frequently used in conductive applications.

Thermal blacks are manufactured by the decomposition of natural gas or oil. They are made in the absence of air by means of a batch type process which is based on sets of dual furnaces (generators). The generators are lined with an open checker brickwork which is preheated prior to charging them with the gas or oil feedstock. The respective heat and make cycles commonly require a few minutes each. Following the make cycle, there is a one-minute steam purge to remove the carbon black, which is then water quenched, passed through the collection filter, and air conveyed to the beader, dryer, and bulk storage loading tank. Following the purge to remove the carbon black, air is passed through the system and carbon remaining on the walls of the generators is burned off to produce additional heat for the next make cycle. Thermal blacks are uniquely large in size (250 to 500 nm average particle diameter) and low in structure (aggregation) relative to all other types of carbon black. They are typically used in cross—linked polyethylene and in rubber applications requiring very high filler volume fractions, or in costly specialty polymers sensitive to degradation with other carbon black grades.

Most of the carbon black grades available today are made by the oil furnace process, which involves the decomposition of highly aromatic oil feedstock in a heated reactor. This is a very rapid, continuous process in which the oil is converted to carbon black aggregates in a few milliseconds. The feedstock oil from storage tanks is injected into the reactor which is heated continuously with a mixture of fuel (oil or gas) and air. The carbon black is water-quenched immediately after formation and then further cooled as it passes through a heat exchanger and on through the bag filter and into the beaders, dryer, and storage tank.

It has long been recognized that oxidized carbon blacks (carbon blacks treated so as to have oxygen—containing functional groups at the surface) feature characteristics which are important to specific applications. For example, in paint, ink, toner, and coatings applications, oxidized carbon blacks provide improved wettability and rheology, characteristics which are important in these applications.

More recently oxidized rubber carbon blacks have been shown to provide enhanced filler-elastomer interaction in crosslinked polymers resulting in improved filler-elastomer interaction (De Trano et al., Bridgestone Corp., U.S. Pat. No. 5,248,722). This improved interaction leads to desireable dynamic properties such as higher elastic modulus and reduced tan delta or hysteresis. Reductions in hysteresis are of utmost concern for tire manufacturers since this property is directly related to the rolling resistance of the tire. It is well known to those skilled in the art that rolling resistance can be predicted from measurements of tan delta at low dynamic strain amplitudes around one percent at about 50 degrees centrigrade.

Obtaining the improved filler-elastomer interaction from oxidized rubber carbon blacks requires chemical interaction with the polymer, such as, might be obtained from a functionalized elastomer in which some or all of the polymer ends contain chemically modified terminal groups.

Previous commercial methods for oxidizing carbon black have included ozone in the gaseous phase, and nitric acid in the liquid phase. Both methods have been used for oxidizing specialty carbon blacks. These methods are inefficient for oxidizing rubber grade carbon blacks because rubber grade carbon blacks are produced at much higher rates. Also the ozone and nitric acid methods both potentially emit noxious gases and require costly corrosion-proof equipment beyond what is normally utilized in carbon black production. A better method to oxidize rubber grade carbon black would entail no hazardous emissions, no large capital expenditure for equipment, ability to oxidize at rubber grade carbon black production rates, and economical cost.

Gaseous hydrogen peroxide has also been used to oxidize carbon blacks (See, for example, U.S. Pat. No. 3,279,935). However, unlike the instant invention which uses liquid hydrogen peroxide solution, the use of gaseous hydrogen peroxide to oxidize carbon blacks poses significant safety risks and expenses, and is not well suited for industrial use to oxidize rubber grade carbon blacks. For example, by using gas phase hydrogen peroxde, the '935 method produces dangerous gases and must utilize fluid bed or Roto-Louvre driers, rather than conventional carbon black process equipment like the instant invention.

A Russian paper has disclosed the use of hydrogen peroxide in a liquid phase to oxidize carbon black (Lezhnez, N. N., et al., Proizv. Shin Rti lati 1974 No. 11, 1974, P. 10–13). However, unlike the instant invention where the hydrogen peroxide/carbon black mixture is dried, and/or heated for drying, and where a drying step is clearly a necessary step in order to oxidize the carbon black and no pre-drying/heating mixing time is required, the Russian paper teaches that a stirring time of 50–70 minutes and a cooling time at room temperature of 45 minutes are necessary for oxidation, and that drying and heating the mixture are not steps in the oxidation process. The paper reports that "the hydrogen peroxide [breaks] down completely" during the pre-heating mixing and cooling. Therefore, the paper teaches that the oxidation of the carbon black is considered to be completed prior to, and regardless of whether, any drying step, or heating to effect a drying step, is performed subsequent to mixing the carbon black with the liquid hydrogen peroxide.

However, contrary to the report of the Russian reference, the data presented herein show that in order to efficiently and effectively oxidize carbon black with liquid hydrogen peroxide, it is necessary that the hydrogen peroxide/carbon black mixture be dried and/or heated to a temperature of at least 105° C. to effect drying. Further, it is herein shown that the pre-heating mixing/cooling period can be kept to a minimum; merely the time necessary to mix the reagents.

Hence, the data herein present the first efficient and effective use of liquid hydrogen peroxide to oxidize carbon black.

Further, the present invention presents the first process for efficiently and effectively oxidizing carbon black that entails no hazardous emissions, no large capital expenditure for special and costly equipment, and the ability to oxidize at rubber grade carbon black production rates, resulting in economical production costs.

SUMMARY OF THE PRESENT INVENTION

Prior art methods for producing oxidized carbon blacks are ineffective, inefficient, potentially emit noxious gases and require costly corrosion-proof equipment beyond. A method of producing oxidized carbon blacks is needed that would entail no hazardous emissions, no large capital expenditure for equipment, the ability to oxidize at rubber grade carbon black production rates and therefore be economical. The present invention provides such a method.

This invention provides a method for effectively and efficiently oxidizing industrial quantities of carbon black with liquid hydrogen peroxide under conditions where no noxious gases are emitted and where no special equipment is needed beyond that normally used in the production of industrial amounts of carbon black products.

Disclosed herein is a process whereby carbon black is mixed with an aqueous solution of hydrogen peroxide and the mixture is then dried, and/or heated in order to effect dying, in order to oxidize the carbon black.

The present invention is intended to oxidize any type of carbon blacks including, but not limited to any types of carbon blacks produced by the incomplete combustion or thermal decomposition of natural gas or petroleum oil. Such carbon blacks include, but are not limited to, channel blacks, furnace blacks, thermal blacks and the like. Carbon blacks used in the instant invention maybe those typically used in the production of truck, auto, and other types of tires as well as different types of rubber products containing carbon black. Carbon blacks oxidized by the present invention may also include those used in inks, as coloring agents, coatings, plastics, etc. Representative types of carbon blacks which can be oxidized by the present invention include, but are in no manner limited to, the N100, N200 and N300 series blacks such as, but not limited to, N110, N115, N121, N343, CD-2041, N326, N134, N220, N231, N234, N330, N339, N347, N375, CD-2013, CD-2014, CD-2015, CD-2016, CD-2005, OB-2015, HV-3396, RCB 2–17, N219, N242, N299, N351 and other ASTM grades (see also Columbian's Industrial Carbon blacks as disclosed in the Raven Brochures).

The hydrogen peroxide solutions of the present invention may be made from any commercially available source of hydrogen peroxde, such as FMC and may be used in varying strengths (percents of hydrogen peroxide in aqueous solution). As outlined below, in a preferred embodiment of the present invention, from 3.75%, to 30%, to greater than 30% aqueous hydrogen peroxide solutions were used to oxidize N343 and CD-2013 carbon blacks, with the 30%, and greater than 30% solutions providing the greatest degree of oxidation. Indeed, solutions expressly containing >30% aqueous hydrogen peroxide can be well used in a preferred embodiment. Indeed, in embodiments of the present invention, concentrations of aqueous hydrogen peroxide of greater than 30% such as but not limited to, for example, 31%, 32%, 33%, 35%, 37%, 40%, 45%, 48%, and 50% can be used.

Further, for example, hydrogen peroxide concentrations used in this invention can be made by, for example, standard dilution techniques and/or, for example, by combining, for example, 50% hydrogen peroxide with a water spray in the beader in the process of the invention.

EXAMPLE 1

The process utilized equipment that is commonly found in commercial carbon black production and for lab experimentation. In the commercial process, powder carbon black is fed to a pin beader for continuous pelletizing of the carbon black. Also in rubber grade products a dilute solution of a binder such as corn syrup or lignin sulfonate is applied to the carbon black powder at about a 1:1 ratio in the pelletizing process. In the lab oxidation process described herein, the water solution is replaced with an aqueous mixture of 30% or greater than 30% hydrogen peroxide solution and added to the carbon black powder in a batch pin beader at about a 1:1 ratio.

The pin beader is then operated at a sufficient rotational speed and time (30–60 sec.) to form carbon black beads or pellets. The wet carbon black pellets are then, after any reasonable time period (from immediately to 72 hours after beading were tested), placed in a rotary drier. In a production process the pin beader is a continuous operation as is the drier. The rotary drier in the lab experiment has an open face permitting atmospheric air to freely enter the drier and contact the carbon black. The drier is heated to an internal temperature of 350° F. and the carbon black tumbled in the drier to sufficiently dry the carbon black, which under the practice of the present invention, oxidizes the carbon black. In a production process the drier would entail using a forced air fan or tail gas to create a large draft to allow moisture to escape.

Lab scale experiments of this nature have been often scaled up to the full plant process without difficulty, and no difficulty is foreseen in the scaling up of this process.

EXAMPLE 2

The initial trial of this procedure utilized Columbian Chemicals CD-2013 pelletized carbon black. The pelletized carbon black was reduced to powder form via micropulverizer and re-beaded in the process described with 30% hydrogen peroxide and dried for three hours at 350° F. Comparison of the hydrogen peroxide oxidized sample with the unoxidized control material shows a significant decrease in pH and increase in oxygen and volatile level comparable to ozone oxidizing carbon black.

| Sample | pH | Volatile % | Oxygen % |
|---|---|---|---|
| CD-2013 Control | 6.1 | 2.1 | 1.08 |
| CD-2013 Hydrogen Peroxide | 3.4 | 3.6 | 2.18 |
| CD-2013 Ozone Oxidation | — | 3.9 | — |

EXAMPLE 3 HYDROGEN PEROXIDE OXIDIZED N343

The test above was repeated for a different grade of carbon black, Columbian Chemicals N343 with the time in the drier reduced to one hour. This sample was also compared to N343 oxidized with ozone to two different levels.

| Sample | pH | Volatile % | Oxygen % |
|---|---|---|---|
| N343 Control | 6.4 | 2.6 | 1.99 |
| N343 Hydrogen Peroxide | 3.4 | 3.8 | 2.92 |
| N343 Ozone High Level | 3.9 | 4.1 | 2.51 |
| N343 Ozone Low Level | 4.2 | 3.5 | 2.43 |

As shown the Hydrogen, Peroxide oxidation reduced the pH level and increased the oxygen percentage more than the ozone oxidations. The hydrogen peroxide sample has a volatile level intermediate to the two ozone oxidation treatments.

The first three samples above were also measured by aqueous and non-aqueous base titration with the results again indicating the efficiency of the hydrogen peroxide oxidation.

| Sample | Aqueous Based Titration | | | Non-aqueous Based Titration |
|---|---|---|---|---|
| | Total acids ($\mu$eg/g) | Ionized Acids ($\mu$eg/g) | NaHCO$_3$ Equivalence ($\mu$eg/g) | Thermometric Titration (mcal/g) |
| N343 Control | 6.18 | 4.07 | 2.11 | 200 |
| N343 Hyd. per. | 86.8 | 8.9 | 77.9 | 1098 |
| N343 Ozone | 58.4 | 8.6 | 49.8 | 965 |

EXAMPLE 4 HYDROGEN PEROXIDE CONCENTRATION STUDY

Various hydrogen peroxide concentrations were tested for oxidation efficiency. The hydrogen peroxide concentration was adjusted by adding distilled water to a 30% hydrogen peroxide solution. Oxidized samples were prepared as previously described with a one hour drier time at 350° F. in a rotary drier. Data below, and in the plot attached, shows that the oxidation level can be controlled by the concentration of hydrogen peroxide. These samples are compared to a N343 sample that was rebeaded in the same method as the hydrogen peroxide samples using only distilled water. The distilled water beaded sample has a pH of 5.2 versus the lower pH levels of the hydrogen peroxide oxidized samples.

| Sample | pH | Volatile % | Oxygen % |
|---|---|---|---|
| N343 Hydrogen Peroxide 30% | 3.3 | 3.5 | 2.93 |
| N343 Hydrogen Peroxide 15% | 3.7 | 3.2 | 2.68 |
| N343 Hydrogen Peroxide 7.5% | 4.3 | 3.2 | 2.45 |
| N343 Hydrogen Peroxide 3.75% | 4.8 | 2.9 | 2.30 |
| N343 Hydrogen Peroxide 0% | 5.2 | 3.0 | 2.05 |

EXAMPLE 5 EFFECT OF DRYER VARIATIONS

A test was initiated to evaluate different drying methods. A N343 carbon black sample was wet beaded with 30% hydrogen peroxide as the previously described sample. Two parts of the sample were retained and dried by two different methods, static beds of carbon black in a forced air oven and vacuum oven. The carbon black sample was dried in the vacuum oven for one hour at 350° F. The carbon black in the forced air oven took four hours at 350° F. to dry. This supports the fact that air is not required. This shows the fact that air is not required in drying, ie, that tail gas through the driver is a sufficient method of drying.

| Sample | pH | Volatile % | Oxygen % |
|---|---|---|---|
| N343 Rotary Drier | 3.4 | 3.8 | 2.68 |
| N343 Forced Air Oven | 2.7 | 3.46 | 2.45 |
| N343 Vacuum Oven | 2.75 | 3.40 | 2.41 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for oxidizing carbon black which comprises:
   mixing carbon black with a liquid hydrogen peroxide to confect a wet solution; and
   subjecting the wet solution of carbon black and hydrogen peroxide to an external dryer to simultaneously dry and oxidize the carbon black by the hydrogen peroxide.

2. The process for oxidizing carbon black of claim 1, wherein the hydrogen peroxide solution is about 3.75 percent hydrogen peroxide in water to about 30 percent hydrogen peroxide in water.

3. The process for oxidizing carbon black of claim 1, wherein the hydrogen peroxide solution is greater than 30 percent hydrogen peroxide in water.

4. The process for oxidizing carbon black of claim 1, wherein the mixture of carbon black and hydrogen peroxide is heated to dryness such that the hydrogen peroxide oxidizes the carbon black.

5. The process for oxidizing carbon black of claim 1, wherein the mixture of carbon black and hydrogen peroxide is boiled to effect the drying to effect oxidation of the carbon black by the hydrogen peroxide.

6. The process for oxidizing carbon black of claim 1, wherein the mixture of carbon black and hydrogen peroxide is heated to a temperature of greater than 105 degrees C.

7. The process for oxidizing carbon black of claim 1, wherein the hydrogen peroxide solution is greater than 20 percent hydrogen peroxide in water.

8. The process for oxidizing carbon black of claim 1, wherein the hydrogen peroxide and carbon black are mixed in about a 1:1 W:W ratio of hydrogen peroxide solution to carbon black.

* * * * *